US012812705B2

(12) United States Patent
Liu

(10) Patent No.: US 12,812,705 B2
(45) Date of Patent: Nov. 24, 2026

(54) RELAY IDENTIFICATION METHOD, RELAY DETERMINING METHOD, TERMINAL, AND NETWORK SIDE DEVICE

(71) Applicant: VIVO MOBILE COMMUNICATION CO., LTD., Dongguan (CN)

(72) Inventor: Jiamin Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 287 days.

(21) Appl. No.: 18/404,056

(22) Filed: Jan. 4, 2024

(65) Prior Publication Data

US 2024/0147554 A1 May 2, 2024

Related U.S. Application Data

(63) Continuation of application No. PCT/CN2022/104935, filed on Jul. 11, 2022.

(30) Foreign Application Priority Data

Jul. 13, 2021 (CN) ......................... 202110792043.8

(51) Int. Cl.

| | |
|---|---|
| ***H04W 76/14*** | (2018.01) |
| ***H04W 76/20*** | (2018.01) |
| ***H04W 88/04*** | (2009.01) |
| ***H04W 92/18*** | (2009.01) |

(52) U.S. Cl.

CPC ........... *H04W 76/14* (2018.02); *H04W 76/20* (2018.02); *H04W 88/04* (2013.01); *H04W 92/18* (2013.01)

(58) Field of Classification Search

CPC ..... H04W 76/14; H04W 76/20; H04W 88/04; H04W 92/18; H04W 76/11; H04W 8/20; H04W 8/205

See application file for complete search history.

(56) References Cited

U.S. PATENT DOCUMENTS

| | | | | |
|---|---|---|---|---|
| 2018/0249524 | A1* | 8/2018 | Yi | H04L 61/5092 |
| 2020/0100174 | A1* | 3/2020 | Kim | H04W 8/20 |
| 2020/0128447 | A1* | 4/2020 | Ying | H04W 36/008355 |
| 2021/0314935 | A1* | 10/2021 | Luo | H04W 72/51 |
| 2022/0225448 | A1* | 7/2022 | Li | H04B 7/15 |
| 2023/0063139 | A1* | 3/2023 | Du | H04W 40/22 |
| 2023/0319549 | A1* | 10/2023 | Dees | H04W 12/02 455/410 |

FOREIGN PATENT DOCUMENTS

| | | | |
|---|---|---|---|
| CN | 107690165 | A | 2/2018 |
| CN | 108307472 | A | 7/2018 |
| CN | 111328080 | A | 6/2020 |
| CN | 111901784 | A | 11/2020 |
| CN | 111901847 | A | 11/2020 |
| EP | 4030800 | * | 1/2021 |
| WO | 2020223629 | A1 | 11/2020 |

* cited by examiner

*Primary Examiner* — Abdullahi E Salad

(74) *Attorney, Agent, or Firm* — The Webb Law Firm

(57) ABSTRACT

A relay identification method includes sending, by relay UE, first identifier information to a serving base station, where the first identifier information includes at least a first PC5 Layer-2 identifier of the relay UE; or sending, by the relay UE, second identifier information to remote UE. The second identifier information includes at least a Uu identifier of the relay UE, and the serving base station is a base station serving the relay UE and the remote UE.

10 Claims, 10 Drawing Sheets

200

RELAY IDENTIFICATION METHOD, RELAY DETERMINING METHOD, TERMINAL, AND NETWORK SIDE DEVICE

CROSS-REFERENCE TO RELATED APPLICATIONS

This application is a Bypass Continuation application of International Patent Application No. PCT/CN2022/104935 filed Jul. 11, 2022, and claims priority to Chinese Patent Application No. 202110792043.8 filed Jul. 13, 2021, the disclosures of which are hereby incorporated by reference in their entireties.

BACKGROUND OF THE INVENTION

Field of the Invention

This application pertains to the field of wireless communication technologies, and relates to a relay identification method, a relay determining method, a terminal, and a network side device.

Description of Related Art

Communication systems such as a 5th generation new radio (5G NR) system and a Long Term Evolution (LTE) system can support sidelink (SL) transmission, that is, data transmission may be directly performed on a physical layer between user equipments (UE, that is, terminals) without using a network device, that is, an SL relay architecture.

SUMMARY OF THE INVENTION

Embodiments of this application provide a relay identification method, a relay determining method, a terminal, and a network side device.

According to a first aspect, a relay identification method is provided, including at least one of the following: sending, by relay UE, first identifier information to a serving base station, where the first identifier information includes at least a first PC5 Layer-2 identifier of the relay UE; or sending, by the relay UE, second identifier information to remote UE, where the second identifier information includes at least a Uu identifier of the relay UE, and the serving base station is a base station serving the relay UE and the remote UE.

According to a second aspect, a relay determining method is provided. The method includes at least one of the following: sending, by remote UE, first information to a serving base station, where the first information carries at least a first identifier; or receiving, by the remote UE, second information sent by the serving base station, where the second information carries at least a second identifier, where the first identifier is used to instruct the serving base station to identify first relay UE, the second identifier is used to instruct the remote UE to identify second relay UE, the serving base station is a base station serving the second relay UE and the remote UE, and/or the serving base station is a base station serving the first relay UE and the remote UE.

According to a third aspect, a relay determining method is provided. The method includes at least one of the following: receiving, by a serving base station, first identifier information sent by relay UE, where the first identifier information includes at least a first PC5 Layer-2 identifier of the relay UE; or receiving, by the serving base station, first information sent by remote UE, where the first information carries at least a first identifier; and sending, by the serving base station, second information to the remote UE, where the second information carries at least a second identifier, where the first identifier is used by the serving base station to identify first relay UE, the second identifier is used by the remote UE to identify second relay UE, the serving base station is a base station serving the relay UE and the remote UE, and/or the serving base station is a base station serving the first relay UE and the remote UE.

According to a fourth aspect, a relay identification apparatus is provided. The apparatus is applied to relay UE and includes a first sending module, where the first sending module is configured to perform at least one of the following: sending first identifier information to a serving base station, where the first identifier information includes at least a first PC5 Layer-2 identifier of the relay UE; or sending second identifier information to remote UE, where the second identifier information includes at least a Uu identifier of the relay UE, and the serving base station is a base station serving the relay UE and the remote UE.

According to a fifth aspect, a relay determining apparatus is provided. The apparatus is applied to remote UE and includes at least one of the following: a second sending module, configured to send first information to a serving base station, where the first information carries at least a first identifier; or a second receiving module, configured to receive second information sent by the serving base station, where the second information carries at least a second identifier, where the first identifier is used to instruct the serving base station to identify first relay UE, the second identifier is used to instruct the remote UE to identify second relay UE, the serving base station is a base station serving the second relay UE and the remote UE, and/or the serving base station is a base station serving the first relay UE and the remote UE.

According to a sixth aspect, an apparatus for identifying relay UE is provided. The apparatus is applied to a serving base station and includes at least one of a third receiving module or a third sending module, where the third receiving module is configured to perform at least one of the following: receiving first identifier information sent by relay UE, where the first identifier information includes at least a first PC5 Layer-2 identifier of the relay UE; or receiving first information sent by remote UE, where the first information carries at least a first identifier; and the third sending module is configured to send second information to the remote UE, where the second information carries at least a second identifier, where the first identifier is used by the serving base station to identify first relay UE, the second identifier is used by the remote UE to identify second relay UE, the serving base station is a base station serving the relay UE and the remote UE, and/or the serving base station is a base station serving the first relay UE and the remote UE.

According to a seventh aspect, a terminal is provided. The terminal includes a processor, a memory, and a program or an instruction stored in the memory and executable on the processor, and the program or the instruction is executed by the processor to implement the steps of the method according to the first aspect or the second aspect.

According to an eighth aspect, a terminal is provided, including a processor and a communication interface. The communication interface is coupled to the processor, and the processor is configured to run a program or an instruction to implement the method according to the first aspect or the method according to the second aspect.

According to a ninth aspect, a network side device is provided. The network side device includes a processor, a memory, and a program or an instruction stored in the memory and executable on the processor, and the program or the instruction is executed by the processor to implement the steps of the method according to the third aspect.

According to a tenth aspect, a network side device is provided, including a processor and a communication interface. The communication interface is coupled to the processor, and the processor is configured to run a program or an instruction to implement the method according to the third aspect.

According to an eleventh aspect, a non-transitory readable storage medium is provided. The non-transitory readable storage medium stores a program or an instruction, and the program or the instruction is executed by a processor to implement the steps of the method according to the first aspect, the second aspect, or the third aspect.

According to a twelfth aspect, a chip is provided. The chip includes a processor and a communication interface, the communication interface is coupled to the processor, and the processor is configured to run a program or an instruction to implement the steps of the method according to the first aspect, the steps of the method according to the second aspect, or the steps of the method according to the third aspect.

According to a thirteenth aspect, a computer program product/program product is provided. The computer program/program product is stored in a non-transient storage medium, and the program/program product is executed by at least one processor to implement the steps of the method according to the first aspect, the steps of the method according to the second aspect, or the steps of the method according to the third aspect.

According to a fourteenth aspect, an electronic device is provided. The electronic device is configured to perform the steps of the method according to the first aspect, the steps of the method according to the second aspect, or the steps of the method according to the third aspect.

DESCRIPTION OF THE INVENTION

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill based on the embodiments of this application shall fall within the protection scope of this application.

In the specification and claims of this application, the terms “first”, “second”, and the like are intended to distinguish between similar objects but do not describe a specific order or sequence. It should be understood that the terms used in such a way are interchangeable in proper circumstances so that the embodiments of this application can be implemented in orders other than the order illustrated or described herein. Objects classified by “first” and “second” are usually of a same type, and the number of objects is not limited. For example, there may be one or more first objects. In addition, in the specification and claims, “and/or” represents at least one of connected objects, and a character “/” generally represents an “or” relationship between associated objects.

It should be noted that technologies described in the embodiments of this application are not limited to a Long Term Evolution (LTE)/LTE-Advanced (LTE-A) system, and may further be applied to other wireless communication systems such as Code Division Multiple Access (CDMA), Time Division Multiple Access (TDMA), Frequency Division Multiple Access (FDMA), Orthogonal Frequency Division Multiple Access (OFDMA), single-carrier frequency division multiple access (SC-FDMA), and other systems. The terms “system” and “network” in the embodiments of this application may be used interchangeably. The technologies described can be applied to both the systems and the radio technologies mentioned above as well as to other systems and radio technologies. The following describes a New Radio (NR) system for example purposes, and NR terms are used in most of the following descriptions. These technologies can also be applied to applications other than an NR system application, such as a 6th generation (6G) communication system.

Figure 1A:
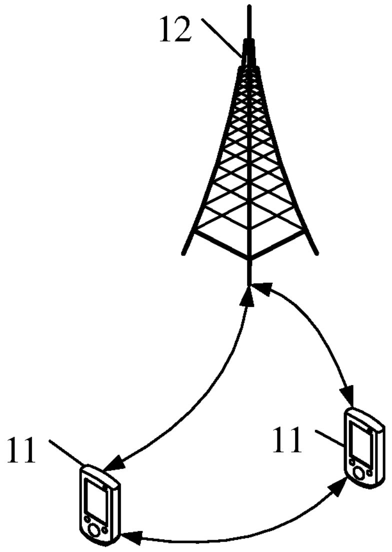
FIG. 1A is a schematic structural diagram of a wireless communication system according to an example embodiment of this application.

FIG. 1A is a schematic structural diagram of a wireless communication system to which the embodiments of this application can be applied. The wireless communication system includes a terminal 11 and a network side device 12. The terminal 11 may also be referred to as a terminal device or user equipment (UE). The terminal 11 may be a terminal-side device such as a mobile phone, a tablet personal computer, a laptop computer or a notebook computer, a personal digital assistant (PDA), a palmtop computer, a netbook, an ultra-mobile personal computer (UMPC), a mobile internet device (MID), a wearable device, vehicle user equipment (VUE), or pedestrian user equipment (PUE). The wearable device includes: a smart watch, a wristband, a headset, and glasses. It should be noted that a specific type of the terminal 11 is not limited in the embodiments of this application. The network side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a wireless local area networks (WLAN) access point, a Wi-Fi node, a transmitting receiving point (TRP), or another appropriate term in the art. As long as a same technical effect is achieved, the base station is not limited to a specified technical term. It should be noted that, in the embodiments of this application, only a base station in an NR system is used as an example, but a specific type of the base station is not limited.

Figure 1B:
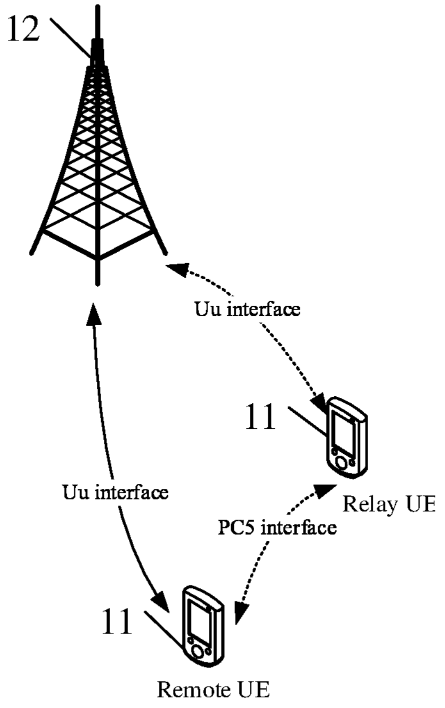
FIG. 1B is a schematic diagram of an SL relay architecture according to an example embodiment of this application.

With reference to FIG. 1B, for an SL relay scene in an NR system, the foregoing terminal 11 may include remote UE and relay UE, and data forwarding may be performed between the remote UE and a serving base station by using relay UE. The relay UE may communicate with the serving base station through a Uu interface, and the relay UE communicates with the remote UE through an SL link interface (also referred to as a PC5 interface). In different communication scenes, role conversion may be performed between the remote UE and the relay UE. For example, the remote UE may be used as relay UE, or the relay UE may be used as remote UE. This is not limited.

In this application, when UE (for example, the remote UE) is switched over from a direct link to an indirect link (that is, a relay link between the remote UE and the serving base station has not been successfully created), there may be but is not limited to the following scenes, and the relay UE needs to be identified.

(1) When a direct connection is established between the remote UE and the serving base station (a gNB), and the gNB needs to configure related measurement for the remote UE, the relay UE needs to be identified.

(2) When a direct connection is established between the remote UE and the gNB, the remote UE needs to report a measurement result to the gNB, where the relay UE needs to be identified in the measurement result.

(3) When a direct connection is established between the remote UE and the gNB, the gNB needs to reconfigure a connection link for the remote UE, for example, switch from a direct link to an indirect link. In the new configuration, the relay UE needs to be identified, so that the remote UE can find correct relay UE to establish an L2 SL relay connection.

(4) When an indirect connection is established between the remote UE and the gNB, and the gNB needs to configure related measurement for the remote UE, the relay UE needs to be identified.

(5) When an indirect connection is established between the remote UE and the gNB, the remote UE needs to report a measurement result to the gNB, where the relay UE needs to be identified in the measurement result.

(6) When an indirect connection is established between the remote UE and the gNB, the gNB needs to reconfigure a connection link for the remote UE, for example, switch from an indirect link to a direct link. In the update configuration, the relay UE needs to be identified, so that the remote UE can find correct relay UE to release an L2 SL relay connection.

(7) When an indirect connection is established between the remote UE and the gNB, the gNB needs to reconfigure a connection link for the remote UE, for example, switch from a source (source) indirect link to a target indirect link. In the update configuration, both source relay UE and target relay UE need to be correctly identified, so that the remote UE can find the correct source relay UE to release an L2 SL relay connection and find the correct target relay UE to create a new L2 SL relay connection.

(8) When an indirect connection is established between the remote UE and the gNB, the gNB needs to reconfigure a connection link for the remote UE, for example, reconfigure a current indirect link. In the new configuration, relay UE that needs to be reconfigured currently needs to be identified, so that the remote UE can find correct relay UE to reconfigure an L2 SL relay link.

For the foregoing different relay identification scenes, a core problem of identifying relay UE is that the relay UE is identified on a PC5 interface and a Uu interface by using different identifiers (ID). Therefore, in this application, in a process of interaction between the remote UE and the serving base station, a PC5 Layer-2 identifier and/or a Uu identifier of the relay UE may be directly carried together, to identify the relay UE.

In the SL relay architecture, because remote UE needs to establish a radio resource control (RRC) connection and an end-to-end user plane transmission channel between the remote UE and a serving base station by means of relay UE forwarding, end-to-end indirect or direct interaction needs to be performed between the remote UE and the serving base station. In the related art, when UE is switched from a direct link (that is, remote UE→serving base station) to an indirect link (that is, remote UE→relay UE→serving base station), or is switched over from an indirect link to a direct link, a measurement process, a reporting process, a reconfiguration process, a switching signaling process, and the like still need to be implemented.

However, in the related art, when the foregoing measurement process, reporting process, reconfiguration process, and switching signaling process are implemented, there is no effective relay UE identification mechanism, resulting in low efficiency of constructing an SL relay architecture.

In this case, with reference to the accompanying drawings, the following describes the technical solutions provided in the embodiments of this application by using some embodiments and application scenes thereof.

Figure 2:
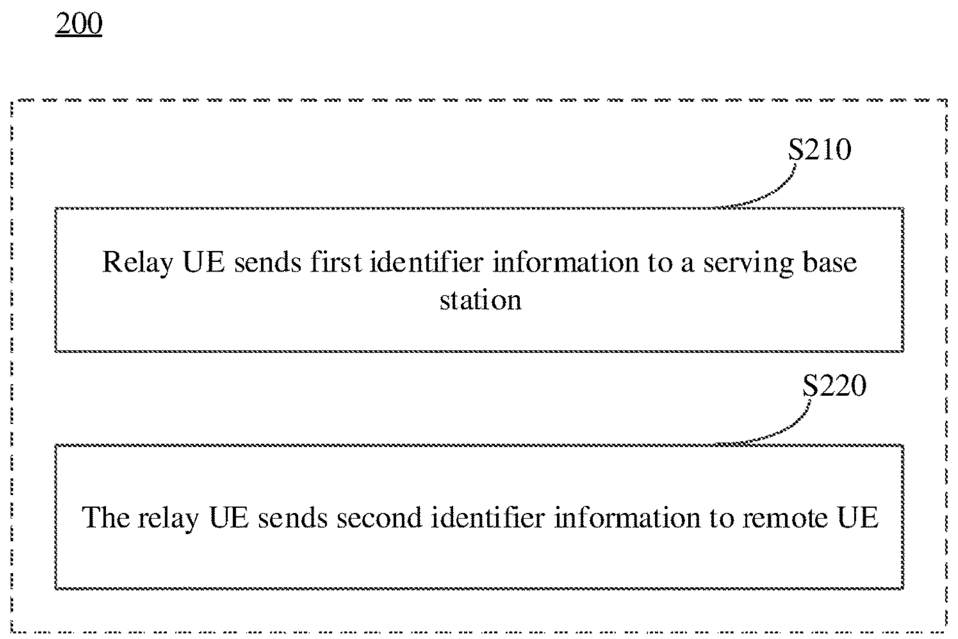
FIG. 2 is a schematic flowchart of a relay identification method according to an example embodiment of this application.

FIG. 2 is a schematic flowchart of a relay identification method 200 according to an example embodiment of this application. The method 200 may be performed by a terminal, for example, relay UE, and may be performed by hardware and/or software installed in the terminal. In this embodiment, the method 200 may include at least one of the following steps.

S210. Relay UE sends first identifier information to a serving base station.

Considering that a Uu interface is used for communication between the relay UE and the serving base station, the relay UE and the serving base station are very clear about a Uu identifier of each other. However, the serving base station does not know a PC5 Layer-2 identifier of a PC5 interface used when the relay UE communicates with remote UE. Therefore, the first identifier information sent by the relay UE to the serving base station may include at least a PC5 Layer-2 identifier (that is, a first PC5 Layer-2 identifier)

of the relay UE, to be used for relay identification in a process of interaction between the remote UE and the serving base station.

In this embodiment, the first PC5 Layer-2 identifier is used by the serving base station to identify the relay UE. Based on this, in a possible implementation, the first identifier information may alternatively include a first mapping relationship between the Uu identifier and the first PC5 Layer-2 identifier of the relay UE, so that the serving base station can identify the relay UE based on the first mapping relationship or the first PC5 Layer-2 identifier.

In addition, when receiving the first identifier information, the serving base station may correspondingly store the Uu identifier of the relay UE and the first PC5 Layer-2 identifier included in the first identifier information, for example, through a list or a mapping relationship, or store the first mapping relationship that is between the Uu identifier and the first PC5 Layer-2 identifier of the relay UE and that is included in the first identifier information, to identify the relay UE in the foregoing scenes (1) to (8).

S220. The relay UE sends second identifier information to remote UE.

In this embodiment, the remote UE and the relay UE have the same serving base station, that is, the serving base station is a base station serving the relay UE and the remote UE.

Considering that a PC5 interface is used for communication between the remote UE and the relay UE, the remote UE and the relay UE are very clear about a PC5 Layer-2 identifier of each other. However, the remote UE does not know a Uu identifier of a Uu interface used when the relay UE communicates with the serving base station. Therefore, the second identifier information sent by the relay UE to the remote UE may include at least the Uu identifier of the relay UE, to be used for relay identification in a process of interaction between the remote UE and the serving base station.

In this embodiment, the Uu identifier is used by the remote UE to identify the relay UE. Based on this, in a possible implementation, the second identifier information may alternatively include a second mapping relationship between the Uu identifier and the PC5 Layer-2 identifier of the relay UE, so that the remote UE can identify the relay UE based on the second mapping relationship.

In addition, when receiving the second identifier information, the remote UE may also correspondingly store the Uu identifier of the relay UE and the first PC5 Layer-2 identifier included in the second identifier information, for example, through a list or a mapping relationship, or store the second mapping relationship that is between the Uu identifier and the first PC5 Layer-2 identifier of the relay UE and that is included in the second identifier information, to identify the relay UE in the foregoing (1) to (8) scenes.

It should be noted that before S210 and/or S220, the relay UE may first determine a type of to-be-sent identifier information, where the type of the to-be-sent identifier information includes at least one of the first identifier information or the second identifier information. In a case that the relay UE determines that the type of the to-be-sent identifier information includes the first identifier information, the relay UE performs S210. In a case that the relay UE determines that the type of the to-be-sent identifier information includes the second identifier information, the relay UE performs S220.

Optionally, in the foregoing S210 and S220, the Uu identifier may include at least one of the following: a cell radio network temporary identifier (C-RNTI), an S-temporary mobile subscription identifier (S-TMSI), an inactive RNTI (I-RNTI), or a first indication identifier, and the first indication identifier is an identifier specifically used for identifying the relay UE.

The C-RNTI is an identifier of UE in a connected state. Generally, in a Pcell, a C-RNTI is used to uniquely identify UE. For example, corresponding UE may be found by using a C-RNTI and a Pcell in which the UE is located.

Optionally, because the relay UE and the remote UE generally have a same Pcell, the relay UE may be directly found by using the C-RNTI. When a subsequent scene is complex, in a case that Pcells of two UEs are different, the relay UE may be identified in a Pcell+C-RNTI manner.

It should be noted that because the C-RNTI is only in one cell, a security requirement is lower than that of the S-TMSI, and leakage will not cause much damage.

The S-TMSI is a relatively static UE identifier, and is generally used when an operation such as paging is performed on UE in an idle state (Idle). Relay UE in any RRC state may be found by using the S-TMSI. However, the S-TMSI has a specified security requirement. If the S-TMSI is leaked, illegal tracking and monitoring of the UE are likely to be adversely affected.

The I-RNTI is an identifier of UE in an inactive state (Inactive). Generally, UE may be uniquely identified in an access network-based notification area (radio access network (RAN)-based notification area, RNA), and a function range of the I-RNTI is generally greater than a cell granularity but less than that of the S-TMSI. Therefore, a security requirement is medium.

The first indication identifier may be a random number or another ID. Considering that the foregoing Uu identifiers are all existing IDs and have a specified security requirement, in this embodiment, a first indication identifier may be generated in a manner of using a random number or re-allocating a Uu identifier, to be specifically used for identifying the relay UE. An application range of the first indication identifier may be a primary cell group (Pcell) granularity, a serving base station (serving gNB) range, an RNA granularity, another specified area granularity, or the like.

In this embodiment, when the first indication identifier is a random number, the random number may be generated by the relay UE and then reported to the serving base station, or may be generated by the serving base station and then allocated to the relay UE. Alternatively, when the first indication identifier is another re-allocated Uu identifier, similar to the foregoing C-RNTI or the like, the first indication identifier needs to be uniformly allocated by the serving base station to the relay UE, to avoid a problem such as an identifier conflict.

It should be noted that, when relay identification is performed based on a Uu identifier, the relay identification may be implemented based on any one of the foregoing Uu identifiers, or may be implemented based on any two or a combination of a plurality of Uu identifiers. This is not limited thereto.

In addition, in the foregoing implementations, when the relay UE needs to perform S210 and S220, a sequence of performing S210 and S220 may be but is not limited to the foregoing sequence.

Based on the foregoing descriptions, in a possible implementation, the relay UE may further receive second indication information sent by the serving base station. The second indication information is used to indicate, to the relay UE, a relay UE identification manner allowed to be used, and/or a range to which the relay UE identification manner is applicable.

Optionally, the relay UE identification manner includes at least one of performing identification through a PC5 Layer-2 identifier, performing identification through a Uu identifier, or performing identification through a PC5 Layer-2 identifier and a Uu identifier.

The range to which the relay UE identification manner is applicable may be designed according to an operator, a geographical area, a cell in which a terminal is located, and the like.

For example, different relay UE identification manners may be selected for different operators.

For another example, different relay UE identification manners may be selected for different geographical areas of one operator.

For another example, different relay UE identification manners may be selected for different cells.

The serving base station may notify the relay UE and the remote UE of the second indication information through configuration (per-configuration) signaling, system information block (SIB) signaling, dedicated signaling, or the like.

In addition, the second indication information may alternatively explicitly or implicitly provide the range to which the relay UE identification manner is applicable. For example, "explicit" means that geographic location or cell list information of an applicable range is explicitly carried in the second indication information, and "implicit" means that an area that can receive signaling is considered as an area that meets a use condition.

For the foregoing several relay UE identification manners and applicable ranges thereof, a corresponding relay UE identification manner and a use range thereof may be selected according to link quality of a Uu link of the relay UE, link quality of a PC5 link, quality of service (QOS) of the remote UE, and the like. For example, when the link quality of the Uu link meets a predetermined condition, a corresponding relay UE identification manner may be selected according to different operators, and no limitation is imposed herein.

In this embodiment of this application, relay UE sends first identifier information to a serving base station and/or sends second identifier information to remote UE, where the first identifier information includes at least a first PC5 Layer-2 identifier of the relay UE, and the second identifier information includes at least a Uu identifier of the relay UE, so that the remote UE and the serving base station can perform relay UE identification based on the first identifier information and/or the second identifier information, thereby implementing an effective relay UE identification mechanism, improving efficiency of constructing an SL relay architecture, and ensuring service experience and system efficiency of the remote UE.

In addition, generally, a Uu interface between a relay UE and a base station does not need to use a PC5 Layer-2 identifier. However, when UE in a connected state (for example, relay UE) needs to perform PC5 interface communication with another UE (for example, remote UE), the UE needs to report PC5 information of a peer end (the remote UE) of the UE, such as a PC5 Layer-2 identifier of the peer end (for example, a Layer-2 identifier of the remote UE), a service type/composition, and a service arrival feature, so that a serving base station configures a bearer configuration and a resource configuration for PC5 communication.

Figure 3:
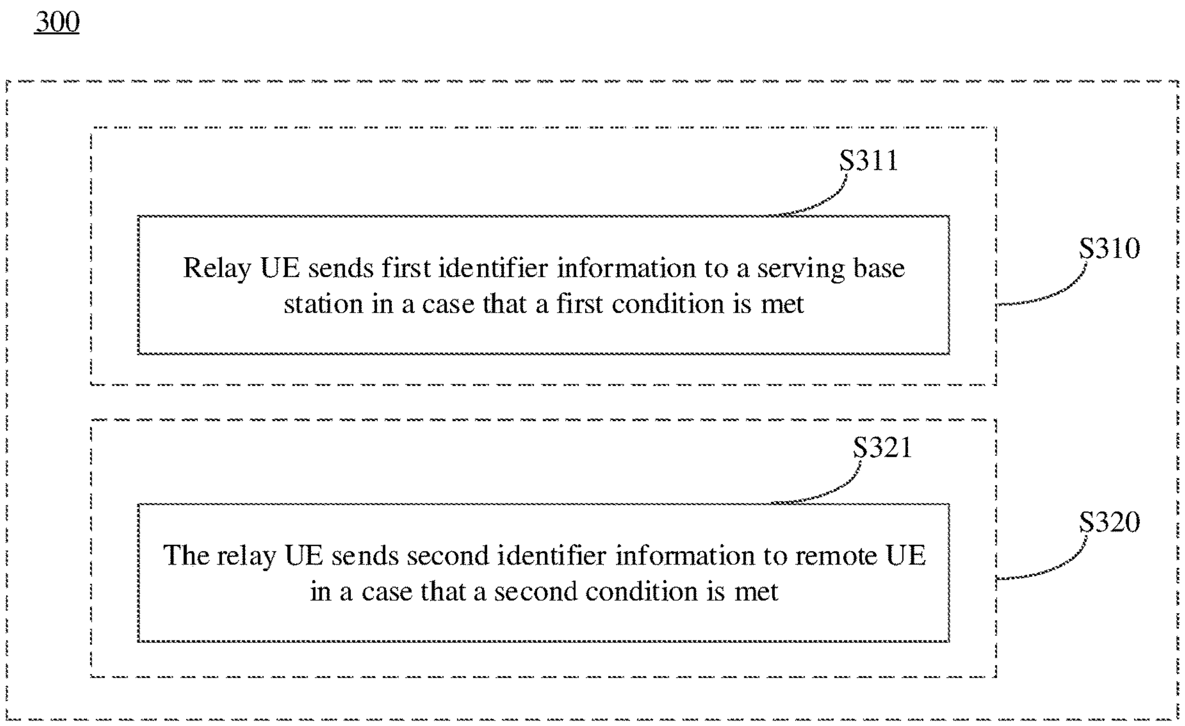
FIG. 3 is a schematic flowchart of a relay identification method according to another example embodiment of this application.

FIG. 3 is a schematic flowchart of a relay identification method 300 according to an example embodiment of this application. The method 300 may be performed by a terminal, for example, relay UE, and may be performed by hardware and/or software installed in the terminal. In this embodiment, the method 300 may include at least the following steps.

S310. Relay UE sends first identifier information to a serving base station.

The first identifier information includes at least a first PC5 Layer-2 identifier of the relay UE.

It can be understood that, for an implementation process of S310, in addition to the related descriptions in the method embodiment 200, to ensure that the serving base station can timely obtain and update a PC5 Layer-2 identifier of the relay UE, in a possible implementation, the implementation process of S310 may further include the following S311.

S311. The relay UE sends the first identifier information to the serving base station in a case that a first condition is met.

The first condition may include at least one of the following (1a) to (1c):

(1a). The relay UE enters a connected state.

For example, after the relay UE enters a connected state, the relay UE may immediately report the PC5 Layer-2 identifier of the relay UE to the serving base station (that is, send the first identifier information) in a Uu RRC process before or after secure activation.

(1b). The first PC5 Layer-2 identifier of the relay UE changes.

For example, when the relay UE is in a connected state, if the relay UE updates the PC5 Layer-2 identifier, the relay UE immediately reports a latest PC5 Layer-2 identifier of the relay UE to the serving base station in a Uu RRC process.

(1c). The first PC5 Layer-2 identifier of the relay UE changes and a change time is within a first time before the relay UE receives a cell switching command, where the serving base station is a base station to which a target cell after switching belongs.

It can be understood that the first time may be N seconds before the relay UE receives the cell switching command, such as 1s or 5s.

For example, if the relay UE updates the PC5 Layer-2 identifier in the first time before switching occurs in a connected state (for example, is before a switching command is received), after being switched to the target cell, the relay UE needs to immediately report the latest PC5 Layer-2 identifier of the relay UE to the serving base station to which the target cell belongs in the Uu RRC process.

In another possible implementation, when reporting the first identifier information, the relay UE may report the first identifier information to the serving base station based on dedicated signaling or non-dedicated signaling. The dedicated signaling is new signaling used by the relay UE, and the new signaling is specifically used to report the first identifier information. The non-dedicated signaling means that the relay UE may multiplex existing signaling to report the first identifier information. That is, the non-dedicated signaling may be used to report the first identifier information, and may be used to report other information except the first identifier information.

Certainly, after receiving the first identifier information sent by the relay UE, the serving base station may determine whether the first PC5 Layer-2 identifier included in the first identifier information is duplicated with a stored PC5 Layer-2 identifier reported by another relay UE. In a case of duplication, the serving base station needs to indicate the duplication problem to the relay UE, for example, send first indication information to the relay UE, so that when receiving the first indication information sent by the serving base station, the relay UE may resend a second PC5 Layer-2 identifier different from the first PC5 Layer-2 identifier to the serving base station, thereby resolving a problem of an identifier conflict of the relay UE. The first indication information is used to indicate that the first PC5 Layer-2 identifier reported by the relay UE is duplicated with the PC5 Layer-2 identifier reported by the another relay UE.

In a case of no duplication, the serving base station may correspondingly store the first PC5 Layer-2 identifier and a Uu identifier of the relay UE, to find or determine the correct relay UE by using the correspondingly stored first PC5 Layer-2 identifier and Uu identifier when the relay UE needs to be identified with remote UE.

S320. The relay UE sends second identifier information to remote UE.

The second identifier information includes at least the Uu identifier of the relay UE.

It can be understood that, for an implementation process of S320, in addition to the related descriptions in the method embodiment 200, to update the Uu identifier of the relay UE to the remote UE in a timely manner, in a possible implementation, referring to FIG. 3 again, the implementation process of S320 may include the following S321.

S321. The relay UE sends the second identifier information to the remote UE in a case that a second condition is met.

The second condition includes at least one of the following (2a) or (2b):

(2a) A PC5 RRC connection is established between the relay UE and the remote UE.

For example, the relay UE may send the Uu identifier of the relay UE to the remote UE after PC5 RRC is safely activated. Correspondingly, after receiving the Uu identifier, the remote UE may return confirmation information to the relay UE. Therefore, not only the Uu identifier of the relay UE can be prevented from being leaked to unrelated UE to avoid security damage, but also communication reliability can be improved.

(2b) The Uu identifier of the relay UE changes.

For example, when the relay UE is in a connected state, if the relay UE updates the Uu identifier, the relay UE immediately sends a latest Uu identifier of the relay UE to the serving base station in a PC5 connection process.

In another possible implementation, the relay UE sends the second identifier information to the remote UE through any one of unicast, broadcast, and multicast.

For example, the relay UE may actively send, in a discovery manner, the Uu identifier of the relay UE to all terminals that are interested in becoming the remote UE. For another example, the relay UE may alternatively send the Uu identifier of the relay UE to specific UE in a PC5 RRC process (which may be before or after secure activation) or in a discovery response manner, and the specific UE is generally a candidate terminal that has or is about to become the remote UE.

Certainly, after receiving the second identifier information, the remote UE may store a mapping relationship between the PC5 Layer-2 identifier and the Uu identifier, so that when the relay UE needs to be identified with the serving base station, the correct relay UE is found or determined by using the mapping relationship.

Figure 4:
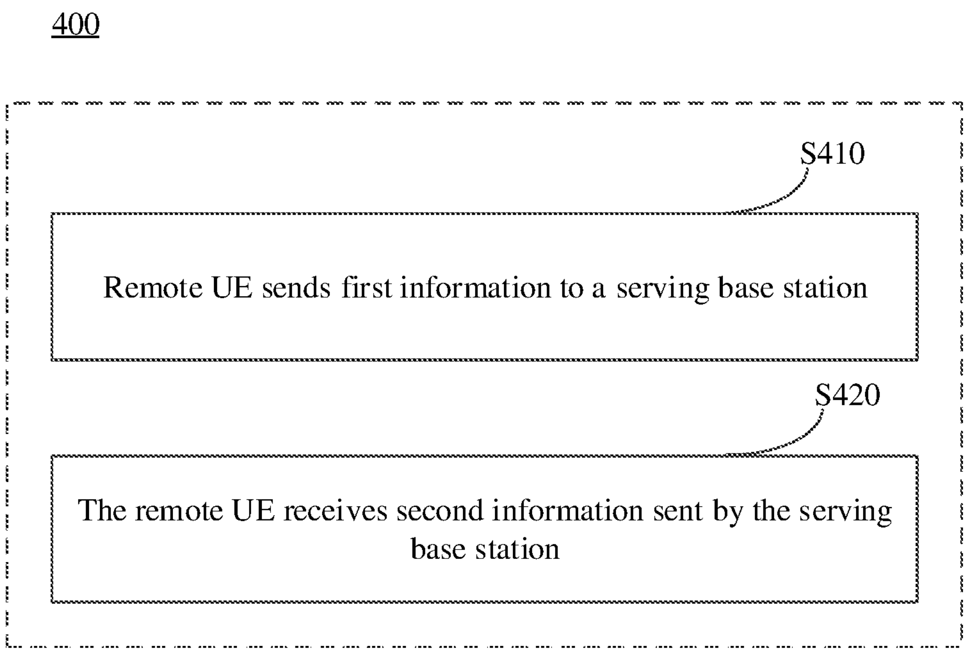
FIG. 4 is a schematic flowchart of a relay determining method according to an example embodiment of this application.

FIG. 4 is a schematic flowchart of a relay identification method 400 according to an example embodiment of this application. The method 400 may be performed by a terminal, for example, remote UE, and may be performed by hardware and/or software installed in the terminal. In this embodiment, the method 400 may include at least one of the following steps.

It should be understood that the relay UE mentioned in this embodiment is generally any relay UE, and first relay UE or second relay UE mentioned in the following embodiment is specifically relay UE corresponding to a first identifier or relay UE corresponding to a second identifier. Based on this, it can be understood that the first relay UE and the second relay UE belong to relay UE mentioned in this embodiment.

S410. Remote UE sends first information to a serving base station.

The first information carries at least a first identifier, to instruct the serving base station to identify first relay UE. Optionally, the first identifier may include at least one of a PC5 Layer-2 identifier or a Uu identifier of the relay UE.

It can be understood that for related descriptions of the PC5 Layer-2 identifier and the Uu identifier of the relay UE included in the first identifier, refer to the descriptions in the method embodiment 200 or 300. To avoid repetition, details are not described herein again.

In this embodiment, the first information may be different in different communication scenes. The following provides descriptions with reference to several different communication scenes.

Scene 1: When the remote UE reports a measurement result to the serving base station, the remote UE may find a Uu identifier of corresponding relay UE by using a PC5 Layer ID of the relay UE and a stored mapping relationship between the PC5 Layer ID and a Uu identifier, and add the Uu identifier of the relay UE to the measurement result (that is, the first information) be sent to the serving base station, so that the base station identifies the relay UE by using the Uu identifier, to send reconfiguration signaling to the relay UE when an operation needs to be performed on the relay UE, for example, when an L2 relay link needs to be established or reconfigured.

Scene 2: When the remote UE determines to switch to a new relay link, the remote UE may find a Uu identifier of corresponding relay UE by using a PC5 Layer ID of the relay UE and a stored mapping relationship between the PC5 Layer ID and a Uu identifier, and add the Uu identifier and/or the Layer-2 identifier of the relay UE to a switching request (that is, the first information) to be sent to the serving base station, so that the serving base station can identify the relay UE based on the Uu identifier and/or the Layer-2 identifier of the relay UE, thereby helping the remote UE find the correct relay UE for relay link switching.

S420. The remote UE receives second information sent by the serving base station.

The second information carries at least a second identifier, to instruct the remote UE to identify second relay UE. Optionally, the second identifier includes at least one of a PC5 Layer-2 identifier or a Uu identifier of the relay UE. The serving base station is a base station serving the second relay UE and the remote UE.

It can be understood that for related descriptions of the PC5 Layer-2 identifier and/or the Uu identifier of the relay UE included in the foregoing second identifier, refer to the descriptions in the method embodiment 200 or 300. To avoid repetition, details are not described herein again.

In this embodiment, the second information may be different in different communication scenes. The following provides descriptions with reference to several different communication scenes.

Scene 1: When determining to switch the remote UE to a new relay link, the serving base station sends a switching command (that is, the second information) to the remote UE, where the switching command may carry the Uu identifier and/or the PC5 Layer-2 identifier of the relay UE, to help the remote UE find correct target relay UE for link switching.

Scene 2: When determining to reconfigure a relay link of the remote UE, the serving base station sends reconfiguration signaling (that is, the second information) to the remote UE, where the reconfiguration signaling may include the Uu identifier and/or the PC5 Layer-2 identifier of the relay UE, to help the remote UE find correct target relay UE for relay link reconfiguration.

Scene 3: When determining to release a relay link of the remote UE, the serving base station sends release signaling or reconfiguration signaling (that is, the second information) to the remote UE, where the release signaling or the reconfiguration signaling includes the Uu identifier and/or the PC5 Layer-2 identifier of the relay UE, to help the remote UE find correct target relay UE for relay link release.

It should be noted that the first information and the second information may be mutually independent, or may have a logical relationship. For example, the second information may be information fed back after the serving base station receives the first information sent by the remote UE, or the first information may be information fed back after the remote UE receives the second information sent by the serving base station. This is not limited thereto.

In this embodiment, a first identifier is carried in first information and a second identifier is carried in second information, so that determined relay UE can be correctly identified between remote UE and a serving base station, to meet a relay UE identification requirement in processes of establishing/reconfiguring/releasing a relay link and performing measurement reporting. Therefore, a relay operation is smoothly performed, thereby improving efficiency of establishing a link and an architecture, and ensuring service experience and system efficiency of the remote UE.

Figure 5:
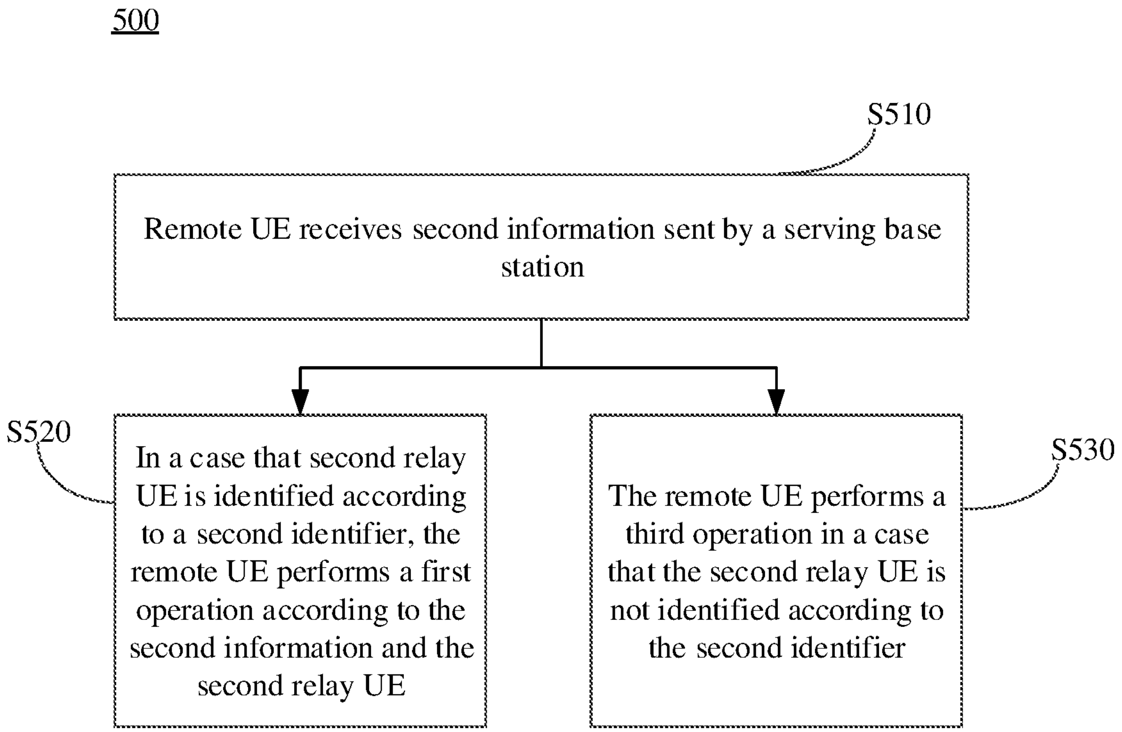
FIG. 5 is a schematic flowchart of a relay determining method according to another example embodiment of this application.

FIG. 5 is a schematic flowchart of a relay identification method 500 according to an example embodiment of this application. The method 500 may be performed by a terminal, for example, remote UE, and may be performed by hardware and/or software installed in the terminal. In this embodiment, the method 500 may include at least one of the following steps.

S510. Remote UE receives second information sent by a serving base station.

The second information carries at least a second identifier, to instruct the remote UE to identify second relay UE.

It can be understood that, for an implementation process of S510, refer to the related descriptions in the method embodiments 200 to 400. To avoid repetition, details are not described again.

S520. The remote UE performs a first operation according to the second information and second relay UE in a case that the second relay UE is identified according to a second identifier.

The first operation includes at least one of relay link switching, relay link configuration, relay link reconfiguration, or relay link release.

For example, in a case that the second information is a switching command sent by the serving base station and the remote UE identifies the second relay UE according to the second identifier, the remote UE may perform a relay link switching operation on the second relay UE.

For another example, in a case that the second information is a reconfiguration command sent by the serving base station and the remote UE identifies the second relay UE according to the second identifier, the remote UE may perform a reconfiguration operation on the second relay UE.

It can be understood that, as described in the method embodiments 200 and 300, before identifying the second relay UE, the remote UE may correspondingly store a Uu identifier and a PC5 Layer-2 identifier of the relay UE according to received second identifier information sent by the relay UE, for example, through a list or a mapping relationship.

In this case, the remote UE may identify the second relay UE in the following manner 1 or manner 2.

Manner 1: The remote UE identifies the second relay UE according to the second identifier and the correspondingly stored Uu identifier and first PC5 Layer-2 identifier.

Manner 2: In a case that the second identifier information sent by the relay UE is received and the second identifier information includes at least a first mapping relationship between the Uu identifier and the PC5 Layer-2 identifier of the relay UE, the remote UE identifies the second relay UE according to the second identifier and the first mapping relationship.

It should be noted that a manner in which the remote UE identifies the second relay UE may be but is not limited to the foregoing manner 1 or manner 2.

Because there is delay in signaling transmission or a first-come-last-come/last-come-first-come case, the remote UE may not synchronize with the identifier of the relay UE stored in the serving base station, thereby causing a problem that the relay UE is incorrectly identified or the relay UE is not identified.

For example, when a PC5 interface between the remote UE and the relay UE has completed updating of a PC5 Layer-2 identifier of the relay UE, that is, the remote UE stores a latest PC5 Layer-2 identifier of the relay UE, on the serving base station side, because reporting signaling (for example, first identifier information) for the relay UE to update the PC5 Layer-2 identifier of the relay UE is not arrived, a mapping relationship between an old PC5 Layer-2 identifier of the relay UE and a Uu identifier is stored on the serving base station. When the serving base station determines to reconfigure/establish/release a relay link, the second information sent to the remote UE still carries the old Layer-2 (that is, the second identifier) of the relay UE, thereby causing a problem that the relay UE is incorrectly identified or the relay UE is not identified.

For another example, when a Uu interface between the relay UE and the serving base station has completed updating of a Uu identifier, and a PC5 interface does not perform updating in time, the remote UE stores an old Uu identifier of the relay UE. When the serving base station determines to reconfigure/establish/release a relay link, the second information sent to the remote UE carries an updated Uu identifier of the relay UE, thereby causing a problem that the relay UE is incorrectly identified or the relay UE is not identified.

For the foregoing two cases, this embodiment may be processed with reference to an implementation process of the following S530, and content is as follows:

S530. The remote UE performs a third operation in a case that the second relay UE is not identified according to the second identifier.

The third operation includes any one of the following (3a) to (3e):

(3a). Perform the first operation in a case that a third identifier is stored in the remote UE and the second relay UE is identified according to the third identifier, where the second identifier is an identifier obtained after the second relay UE updates the third identifier.

For example, the remote UE may store two new and old PC5 layer2 IDs (that is, the second identifier and the third identifier). When the second information sent by the serving base station carries the old PC5 Layer-2 identifier (for example, the third identifier), normal relay identification may be performed.

However, to avoid information redundancy, in this embodiment, the remote UE needs to store the old PC5 Layer-2 identifier within a specified time period, and the old PC5 Layer-2 identifier needs to be deleted if the time period is exceeded. Based on this, if the remote UE does not continue to store the old relay UE Layer-2 identifier or the old storage exceeds the storage time period (expired), as described in the following (3c), a refuse operation may be performed on the second information sent by the serving base station, that is, the second information is refused.

(3b). Perform the first operation according to the second information and the second relay UE in a case that a fourth identifier is received within a second time and the second relay UE is identified according to the fourth identifier, where the fourth identifier is an identifier obtained after the second relay UE updates the second identifier.

For example, when the remote UE fails to identify the second relay UE according to the second identifier, it may be presumed that a PC5 update signaling delay occurs. In this case, the remote UE may wait for a specific time, so that an identifier update process is completed, and then identification and an operation are performed on the second relay UE according to the updated fourth identifier.

However, if updating is not performed in the waiting period, as described in the following (3c), the remote UE may perform a refuse operation on the second information sent by the serving base station.

(3c). Refuse the second information.

That the remote UE refuses the second information may be that the remote UE does not perform any processing.

Alternatively, in a possible implementation, after refusing the second information, the remote UE may further send third indication information to the serving base station, to indicate, to the serving base station, that the remote UE refuses the second information, and/or a reason why the remote UE refuses the second information, for example, the second relay UE cannot be correctly identified.

In this embodiment, "refuse the second information" may be understood as ignore the second information, discard the second information, skip an operation corresponding to the second information, or the like.

(3d). Perform processing according to a radio link failure.

For example, processing may be performed in a manner of releasing a radio link.

(3e). Fall back to an idle state.

In this embodiment, for a possible relay identification failure problem, a corresponding relay identification failure processing mechanism is provided, to meet a relay UE identification requirement in processes of establishing/re-configuring/releasing a relay link and performing measurement reporting.

Figure 6:
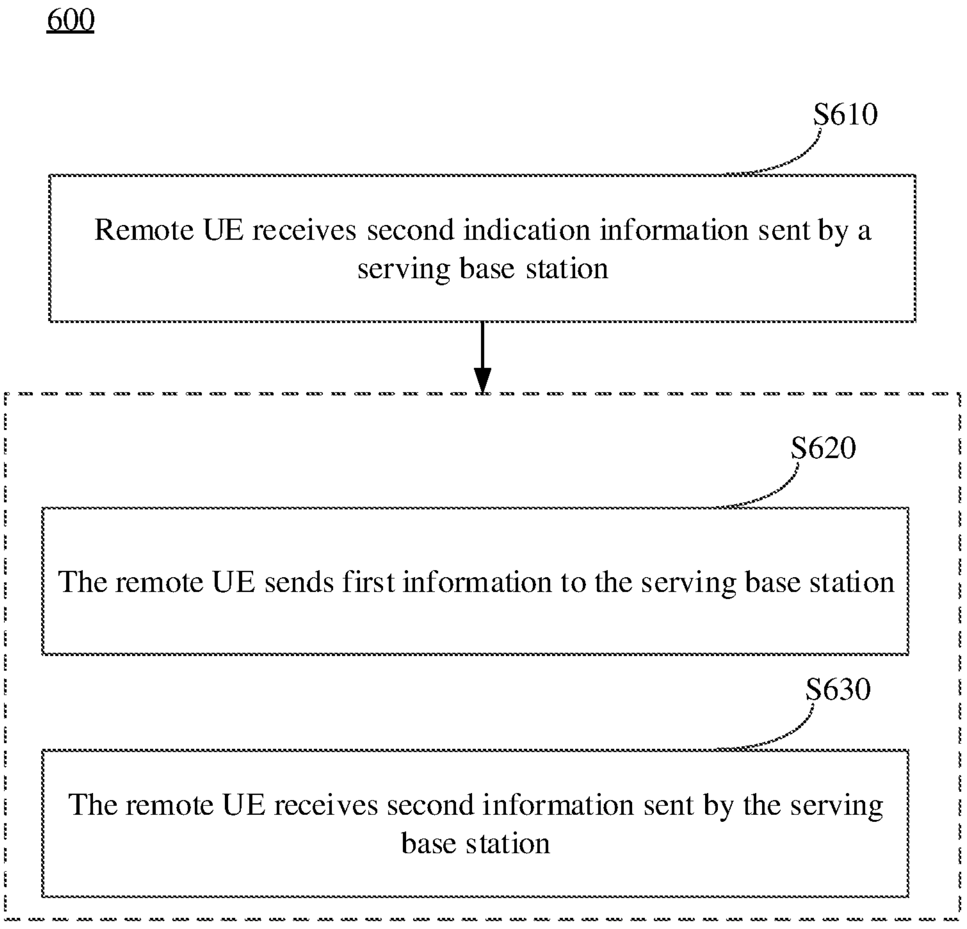
FIG. 6 is a schematic flowchart of a relay determining method according to another example embodiment of this application.

FIG. 6 is a schematic flowchart of a relay identification method 600 according to an example embodiment of this application. The method 600 may be performed by a terminal, for example, remote UE, and may be performed by hardware and/or software installed in the terminal. In this embodiment, the method 600 may include at least one of the following S610, S620, or S630.

S610. Remote UE receives second indication information sent by a serving base station.

The second indication information is used to indicate, to the remote UE, a relay UE identification manner allowed to be used, and/or a range to which the relay UE identification manner is applicable.

The relay UE identification manner includes at least one of performing identification through a PC5 Layer-2 identifier, performing identification through a Uu identifier, or performing identification through a PC5 Layer-2 identifier and a Uu identifier.

It can be understood that, for an implementation process of S610, refer to the related descriptions in the method embodiments 200 to 500. To avoid repetition, details are not described herein again.

S620. The remote UE sends first information to the serving base station.

The first information carries at least a first identifier.

S630. The remote UE receives second information sent by the serving base station.

The second information carries at least a second identifier, where the first identifier is used to instruct the serving base station to identify first relay UE, the second identifier is used to instruct the remote UE to identify second relay UE, and the serving base station is a base station serving the second relay UE and the remote UE, or the serving base station is a base station serving the first relay UE and the remote UE.

It can be understood that, for an implementation process of S610 to 630, refer to the related descriptions in the method embodiments 200 to 500. Corresponding technical effects are achieved. To avoid repetition, details are not described herein again.

Figure 7:
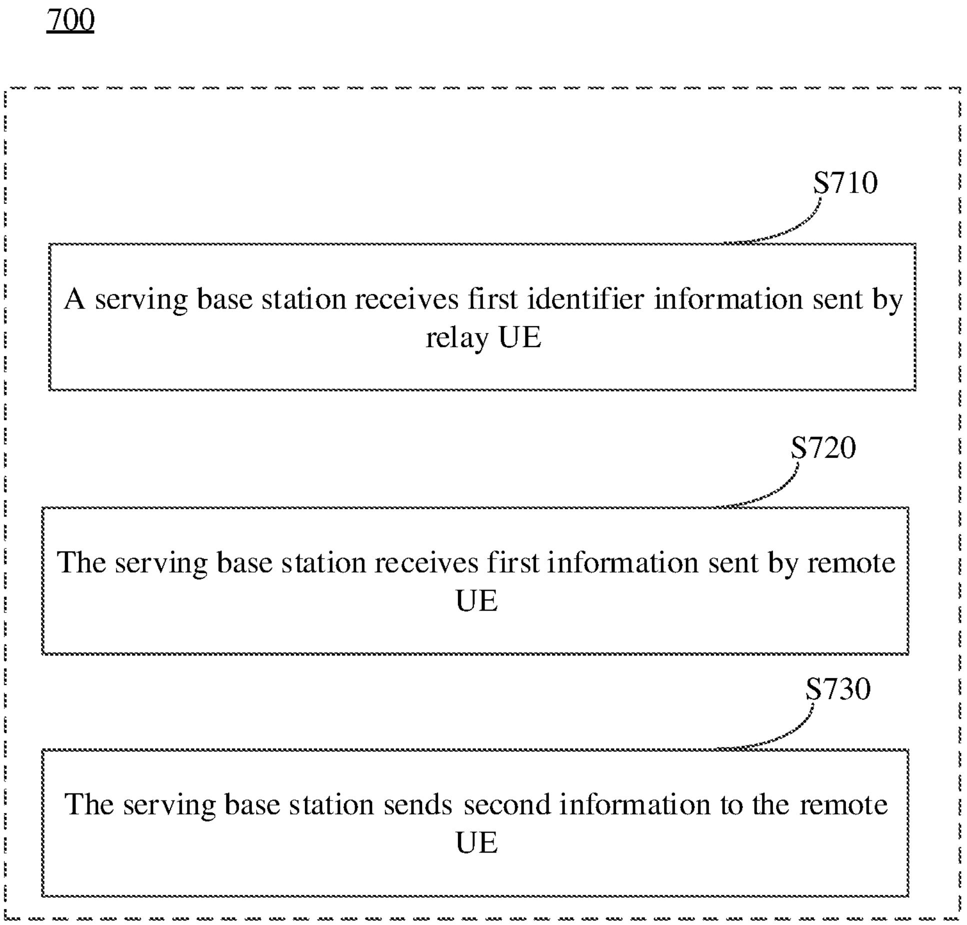
FIG. 7 is a schematic flowchart of a relay determining method according to another example embodiment of this application.

FIG. 7 is a schematic flowchart of a relay determining method 700 according to an example embodiment of this application. The method 700 may be performed by a network side device, for example, a serving base station, and may be performed by hardware and/or software installed in the network side device. In this embodiment, the method 700 may include at least one of the following steps.

S710. A serving base station receives first identifier information sent by relay UE.

The first identifier information includes at least a first PC5 Layer-2 identifier of the relay UE.

In an implementation, the serving base station correspondingly stores the first PC5 Layer-2 identifier and a Uu identifier of the relay UE. In a case that the first PC5 Layer-2 identifier reported by the relay UE is duplicated with a PC5 Layer-2 identifier reported by another relay UE, first indication information is sent to the relay UE.

The first indication information is used to indicate that the first PC5 Layer-2 identifier reported by the relay UE is duplicated with the PC5 Layer-2 identifier reported by the another relay UE.

S720. The serving base station receives first information sent by remote UE.

The first information carries at least a first identifier. Optionally, the first identifier includes a PC5 Layer-2 identifier and/or a Uu identifier of the relay UE.

S730. The serving base station sends second information to the remote UE.

The second information carries at least a second identifier. Optionally, the second identifier includes a PC5 Layer-2 identifier and/or a Uu identifier of the relay UE.

The first identifier is used by the serving base station to identify first relay UE, the second identifier is used by the remote UE to identify second relay UE, the serving base station is a base station serving the relay UE and the remote UE, and/or the serving base station is a base station serving the first relay UE and the remote UE.

It can be understood that, for an implementation process of S710 to S730, in addition to the related descriptions in the foregoing method embodiments 200 to 600, in an optional implementation, the serving base station may send the second information to the remote UE when determining to perform a second operation. The second operation may include at least one of relay link switching, relay link configuration, relay link reconfiguration, or relay link release.

For example, when determining to switch the remote UE to a new relay link (that is, relay link switching), the serving base station sends a switching command (that is, the second information) to the remote UE, where the switching command may carry the Uu identifier and/or the PC5 Layer-2 identifier of the relay UE, to help the remote UE find correct target relay UE for link switching.

For another example, when determining to configure or reconfigure a relay link of the remote UE (that is, relay link configuration or relay link reconfiguration), the serving base station sends configuration signaling or reconfiguration signaling (that is, the second information) to the remote UE, where the configuration signaling or the reconfiguration signaling may include the Uu identifier and/or the PC5 Layer-2 identifier of the relay UE, to help the remote UE find correct target relay UE for relay link reconfiguration.

For another example, when determining to release a relay link of the remote UE (that is, relay link release), the serving base station sends release signaling (that is, the second information) to the remote UE, where the release signaling includes the Uu identifier and/or the PC5 Layer-2 identifier of the relay UE, to help the remote UE find correct target relay UE for relay link release.

In this embodiment, a first identifier is carried in first information and a second identifier is carried in second information, so that determined relay UE can be correctly identified between remote UE and a serving base station, to meet a relay UE identification requirement in processes of establishing/reconfiguring/releasing a relay link and performing measurement reporting. Therefore, a relay operation is smoothly performed, thereby improving efficiency of establishing a link and an architecture, and ensuring service experience and system efficiency of the remote UE.

Figure 8:
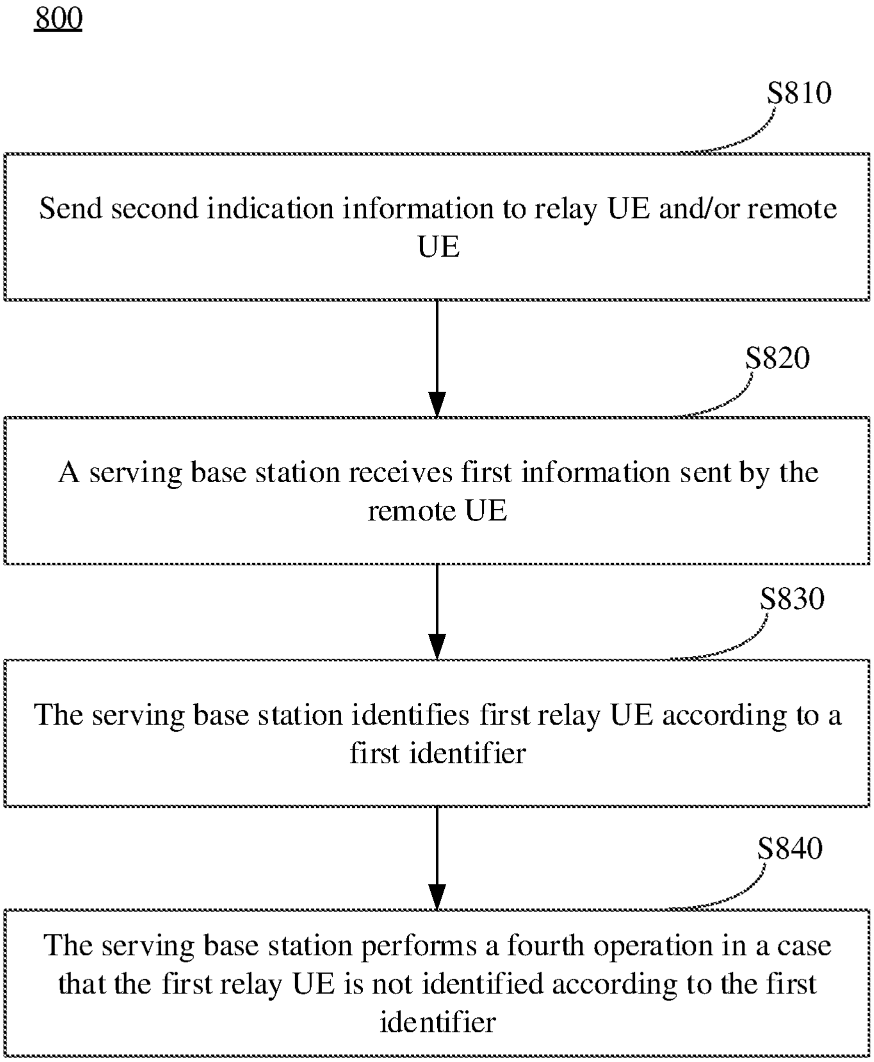
FIG. 8 is a schematic flowchart of a relay determining method according to another example embodiment of this application.

FIG. 8 is a schematic flowchart of a relay determining method 800 according to an example embodiment of this application. The method 800 may be performed by a network side device, for example, a serving base station, and may be performed by hardware and/or software installed in the network side device. In this embodiment, the method 800 may include at least one of the following steps.

S810. Send second indication information to relay UE and/or remote UE.

The second indication information is used to indicate, to the relay UE and/or the remote UE, a relay UE identification manner allowed to be used, and/or a range to which the relay UE identification manner is applicable.

The relay UE identification manner includes at least one of performing UE identification through a PC5 Layer-2 identifier, performing relay UE identification through a Uu identifier, or performing UE identification through a PC5 Layer-2 identifier and a Uu identifier.

It can be understood that, for an implementation process of S810, refer to the related descriptions in the method embodiments 200 to 700. To avoid repetition, details are not described herein again.

S820. A serving base station receives first information sent by the remote UE.

The first information carries at least a first identifier.

S830. The serving base station identifies first relay UE according to the first identifier.

It can be understood that, as described in the method embodiment 200 and/or 300, before identifying the first relay UE, the serving base station may correspondingly store a Uu identifier and a PC5 Layer-2 identifier of the relay UE according to received first identifier information sent by the relay UE, for example, through a list or a mapping relationship.

In this case, the serving base station may identify the first relay UE in the following manner 1 or manner 2.

Manner 1: The serving base station identifies the first relay UE according to the first identifier and the correspondingly stored Uu identifier and first PC5 Layer-2 identifier.

Manner 2: In a case that the first identifier information sent by the relay UE is received and the second identifier information includes at least a second mapping relationship between the PC5 Layer-2 identifier and the Uu identifier of the relay UE, the serving base station identifies the second relay UE according to the first identifier and the second mapping relationship.

It should be noted that a manner in which the serving base station identifies the first relay UE may be but is not limited to the foregoing manner 1 or manner 2.

Because there is delay in signaling transmission or a first-come-last-come/last-come-first-come case, the remote UE may not synchronize with the identifier of the relay UE stored in the serving base station, thereby causing a problem that the relay UE is incorrectly identified or the relay UE is not identified.

For example, when a PC5 interface between the remote UE and the relay UE has completed updating of a PC5 Layer-2 identifier of the relay UE, that is, the remote UE stores a latest PC5 Layer-2 identifier of the relay UE, on the serving base station side, because reporting signaling (for example, first identifier information) for the relay UE to update the PC5 Layer-2 identifier of the relay UE is not arrived, a mapping relationship between an old PC5 Layer-2 identifier of the relay UE and a Uu identifier is stored on the serving base station. When the serving base station determines to reconfigure/establish/release a relay link, the second information sent to the remote UE still carries the old Layer-2 (that is, the second identifier) of the relay UE, thereby causing a problem that the relay UE is incorrectly identified or the relay UE is not identified.

For another example, when a Uu interface between the relay UE and the serving base station has completed updating of a Uu identifier, and a PC5 interface does not perform updating in time, the remote UE stores an old Uu identifier of the relay UE. When the serving base station determines to reconfigure/establish/release a relay link, the second information sent to the remote UE carries an updated Uu identifier of the relay UE, thereby causing a problem that the relay UE is incorrectly identified or the relay UE is not identified.

For the foregoing two cases, this embodiment may be processed with reference to an implementation process of the following S840, and content is as follows:

S840. The serving base station performs a fourth operation in a case that the first relay UE is not identified according to the first identifier.

The fourth operation includes any one of the following (4a) to (4c):

(4a). Identify the first relay UE according to a fifth identifier in a case that the fifth identifier is received, where the fifth identifier is an identifier obtained after the first relay UE updates the first identifier.

For example, if the serving base station cannot identify the corresponding first relay UE according to the first identifier, it may be determined that there is a delay in reporting and updating the PC5 Layer-2 identifier by the relay UE. In this case, a specific time may be waited, and in a case that the updated fifth identifier is received within the specific time, the first relay UE is identified according to the fifth identifier.

However, if the serving base station does not receive the updated fifth identifier after waiting for the specific time, the serving base station may directly perform processing according to (4b) or (4c).

(4b) Refuse the first information.

That the serving base station refuses the first information may be that the serving base station does not perform any processing.

Alternatively, in an implementation, after refusing the first information, the serving base station may further send indication information to the remote UE, to indicate that the serving base station refuses the first information, a reason for refusing the first information, and the like.

In this embodiment, "refuse the first information" may be understood as ignore the first information, discard the first information, skip an operation corresponding to the first information, or the like.

(4c) Execute a predetermined error processing manner.

The predetermined error processing manner may be link release, link reconfiguration, link switching, or the like.

In this embodiment, for a possible relay identification failure problem, a corresponding relay identification failure processing mechanism is provided, to meet a relay UE identification requirement in processes of establishing/re-configuring/releasing a relay link and performing measurement reporting, and ensure wireless communication performance.

It should be noted that the relay identification method 200 or 300 provided in the embodiments of this application may be performed by a relay identification apparatus, or a control module that is in the relay identification apparatus and that is configured to perform the relay identification method. In the embodiments of this application, an example in which the relay identification apparatus performs the relay identification method is used to describe the relay identification apparatus provided in the embodiments of this application.

Figure 9:
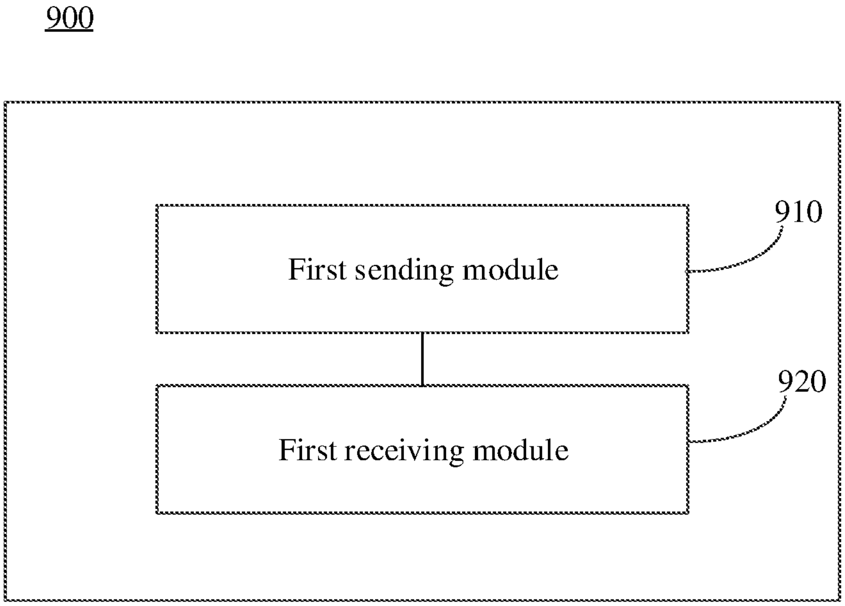
FIG. 9 is a schematic structural diagram of a relay identification apparatus according to an example embodiment of this application.

FIG. 9 is a schematic structural diagram of a relay identification apparatus 900 according to an example embodiment of this application. The apparatus 900 includes a first sending module 910, and the first sending module 910 is configured to perform at least one of the following: sending first identifier information to a serving base station, where the first identifier information includes at least a first PC5 Layer-2 identifier of the relay UE; or sending second identifier information to remote UE, where the second identifier information includes at least a Uu identifier of the relay UE, and the serving base station is a base station serving the relay UE and the remote UE.

Optionally, the first sending module 910 is configured to send the first identifier information to the serving base station in a case that at least one of the following is met: that the relay UE enters a connected state; that the first PC5 Layer-2 identifier of the relay UE changes; or that the first PC5 Layer-2 identifier of the relay UE changes and a change time is within a first time before the relay UE receives a cell switching command, where the serving base station is a base station to which a target cell after switching belongs.

Optionally, the first sending module 910 sends the first identifier information to the serving base station based on dedicated signaling or non-dedicated signaling.

Optionally, the first sending module 910 is further configured to send a second PC5 Layer-2 identifier to the serving base station in a case that first indication information sent by the serving base station is received, where the first indication information is used to indicate that the first PC5 Layer-2 identifier reported by the relay UE is duplicated with a PC5 Layer-2 identifier reported by another relay UE, and the second PC5 Layer-2 identifier is different from the first PC5 Layer-2 identifier.

Optionally, the first sending module 910 is configured to send the second identifier information to the remote UE in a case that the following conditions are met: that a PC5 RRC connection is established between the relay UE and the remote UE; and that the Uu identifier of the relay UE changes.

Optionally, the first sending module 910 sends the second identifier information to the remote UE through any one of unicast, broadcast, and multicast.

Optionally, referring to FIG. 9 again, the apparatus 900 further includes a first receiving module 920, configured to receive second indication information sent by the serving base station, where the second indication information is used to indicate, to the relay UE, a relay UE identification manner allowed to be used, and/or a range to which the relay UE identification manner is applicable; and the relay UE identification manner includes at least one of performing identification through a PC5 Layer-2 identifier, performing identification through a Uu identifier, or performing identification through a PC5 Layer-2 identifier and a Uu identifier.

Optionally, the Uu identifier includes at least one of a C-RNTI, an S-TMSI, an I-RNTI, or a first indication identifier, and the first indication identifier is an identifier specifically used for identifying the relay UE.

In this embodiment, first identifier information is sent to a serving base station, and/or second identifier information is sent to remote UE, where the first identifier information includes at least a first PC5 Layer-2 identifier of relay UE, and the second identifier information includes at least a Uu identifier of the relay UE, so that the remote UE and the serving base station can perform relay UE identification based on the first identifier information and/or the second identifier information, thereby implementing an effective relay UE identification mechanism, improving efficiency of constructing an SL relay architecture, and ensuring service experience and system efficiency of the remote UE.

In addition, the relay determining methods 400 to 800 provided in the embodiments of this application may be performed by a relay determining apparatus, or a control module that is in the relay determining apparatus and that is configured to perform the relay determining method. In the embodiments of this application, an example in which the relay determining apparatus performs the relay determining method is used to describe the relay determining apparatus provided in the embodiments of this application.

Figure 10:
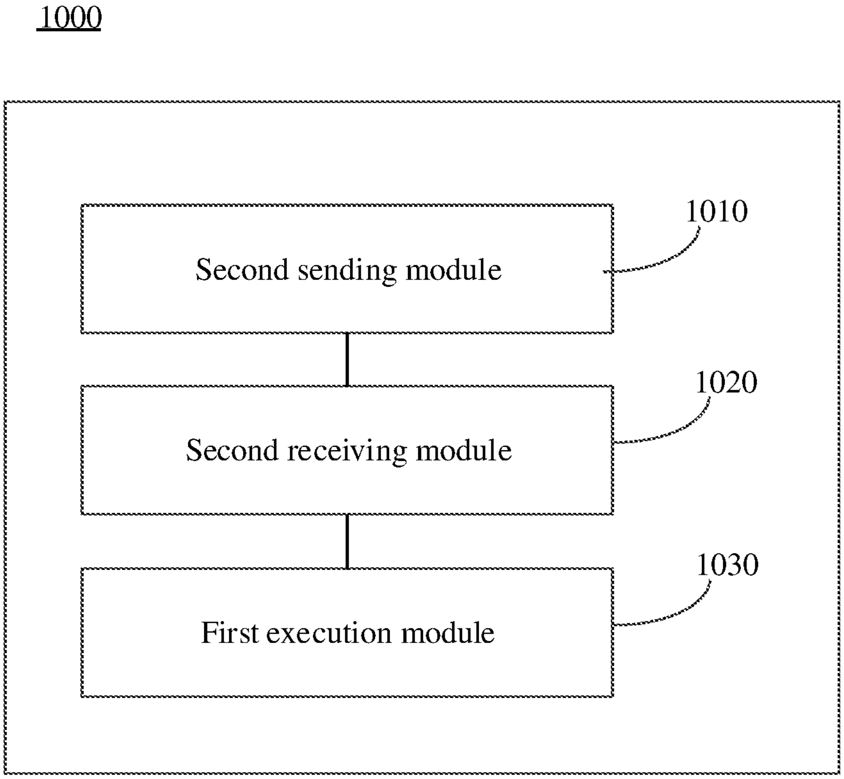
FIG. 10 is a schematic structural diagram of a relay determining apparatus according to an example embodiment of this application.

FIG. 10 is a schematic structural diagram of a relay determining apparatus 1000 according to an example embodiment of this application. The apparatus 1000 includes at least one of the following: a second sending module 1010, configured to send first information to a serving base station, where the first information carries at least a first identifier; or a second receiving module 1020, configured to receive second information sent by the serving base station, where the second information carries at least a second identifier, where the first identifier is used to instruct the serving base station to identify first relay UE, the second identifier is used to instruct the remote UE to identify second relay UE, the serving base station is a base station serving the second relay UE and the remote UE, and/or the serving base station is a base station serving the first relay UE and the remote UE.

Optionally, at least one of the following is included: the first identifier includes at least one of a PC5 Layer-2 identifier or a Uu identifier of the relay UE; or the second identifier includes at least one of a PC5 Layer-2 identifier or a Uu identifier of the relay UE.

Optionally, referring to FIG. 10 again, the apparatus 1000 may further include a first execution module 1030, configured to perform a first operation according to the second information and the second relay UE in a case that the second relay UE is identified according to the second identifier, where the first operation includes at least one of relay link switching, relay link configuration, relay link reconfiguration, or relay link release.

Optionally, the first execution module 1030 is further configured to: in a case that the second relay UE is not identified according to the second identifier, perform any one of the following: performing the first operation in a case that a third identifier is stored in the remote UE and the second relay UE is identified according to the third identifier, where the second identifier is an identifier obtained after the second relay UE updates the third identifier; performing the first operation according to the second information and the second relay UE in a case that a fourth identifier is received within a second time and the second relay UE is identified according to the fourth identifier, where the fourth identifier is an identifier obtained after the second relay UE updates the second identifier; refusing the second information; performing processing according to a radio link failure; and falling back to an idle state.

Optionally, the first execution module 1030 is further configured to send third indication information to the serving base station, where the third indication information is used to indicate, to the serving base station, that the remote UE refuses the second information, and/or the third indication information is used to indicate, to the serving base station, a reason why the remote UE refuses the second information.

Optionally, the first execution module 1030 is further configured to: in a case that second identifier information sent by the relay UE is received and the second identifier information includes at least a Uu identifier of the relay UE, correspondingly store the Uu identifier and a first PC5 Layer-2 identifier of the relay UE; and the first execution module is further configured to perform any one of the following: identifying, by the remote UE, the second relay UE according to the second identifier and the correspondingly stored Uu identifier and first PC5 Layer-2 identifier; or in a case that the second identifier information sent by the relay UE is received and the second identifier information includes at least a first mapping relationship between the Uu identifier and the PC5 Layer-2 identifier of the relay UE, identifying, by the remote UE, the second relay UE according to the second identifier and the first mapping relationship.

Optionally, the second receiving module 1020 is further configured to receive second indication information sent by the serving base station, where the second indication information is used to indicate, to the remote UE, a relay UE identification manner allowed to be used, and/or a range to which the relay UE identification manner is applicable; and the relay UE identification manner includes at least one of performing identification through a PC5 Layer-2 identifier, performing identification through a Uu identifier, or performing identification through a PC5 Layer-2 identifier and a Uu identifier.

In this embodiment, a first identifier is carried in first information and a second identifier is carried in second information, so that determined relay UE can be correctly identified between remote UE and a serving base station, to meet a relay UE identification requirement in processes of establishing/reconfiguring/releasing a relay link and performing measurement reporting. Therefore, a relay operation is smoothly performed, thereby improving efficiency of establishing a link and an architecture, and ensuring service experience and system efficiency of the remote UE.

The apparatus 900 or 1000 in this embodiment of this application may be an apparatus, an apparatus or a terminal with an operating system such as relay UE or remote UE, or a component, an integrated circuit, or a chip in the terminal. The apparatus or the electronic device may be a mobile terminal, or a non-mobile terminal. For example, the mobile terminal may include but is not limited to the types of the foregoing listed terminal 11, and the non-mobile terminal may be a server, a network attached storage (NAS), a personal computer (PC), a television (TV), an automated teller machine, or a self-service machine. This is not specifically limited in this embodiment of this application.

The apparatus 900 or 1000 provided in this embodiment of this application can implement the processes implemented in the method embodiments in FIG. 2 to FIG. 6, and achieve a same technical effect. To avoid repetition, details are not described herein again.

Figure 11:
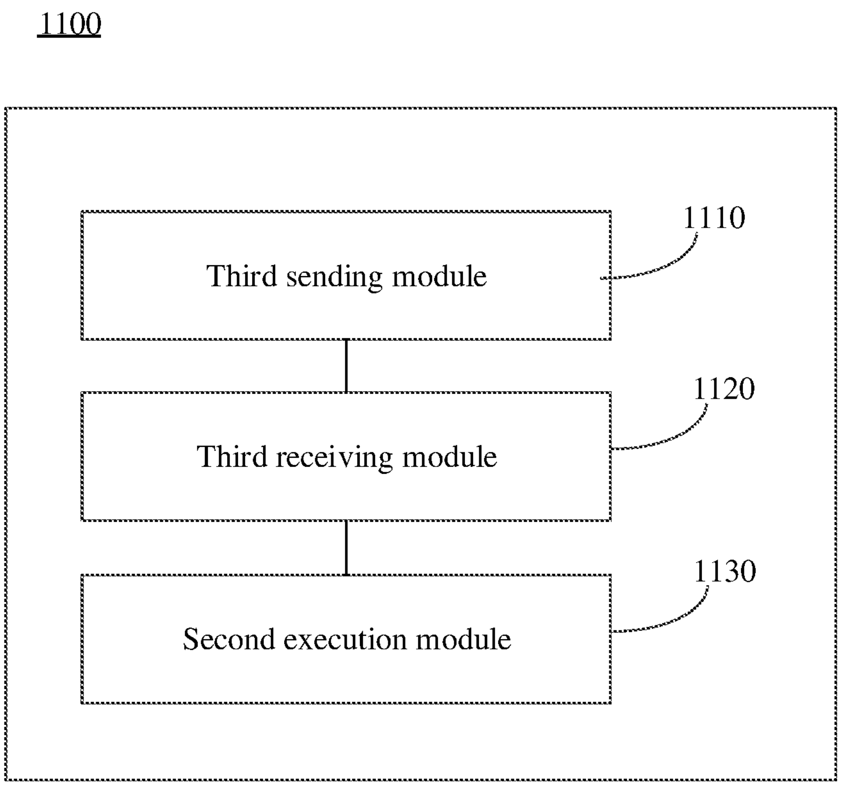
FIG. 11 is a schematic structural diagram of a relay determining apparatus according to another example embodiment of this application.

FIG. 11 is a schematic structural diagram of a relay determining apparatus 1100 according to an example embodiment of this application. The apparatus 1100 includes at least one of a third sending module 1110 or a third receiving module 1120. The third receiving module 1120 is configured to perform at least one of the following: receiving first identifier information sent by relay UE, where the first identifier information includes at least a first PC5 Layer-2 identifier of the relay UE; or receiving first information sent by remote UE, where the first information carries at least a first identifier; and the third sending module is configured to send second information to the remote UE, where the second information carries at least a second identifier, where the first identifier is used by the serving base station to identify first relay UE, the second identifier is used by the remote UE to identify second relay UE, the serving base station is a base station serving the relay UE and the remote UE, and/or the serving base station is a base station serving the first relay UE and the remote UE.

Optionally, at least one of the following is included: the first identifier includes a PC5 Layer-2 identifier and/or a Uu identifier of the relay UE; or the second identifier includes a PC5 Layer-2 identifier and/or a Uu identifier of the relay UE.

Optionally, the apparatus 1100 further includes a second execution module 1130, configured to identify the first relay UE according to the first identifier.

Optionally, the second execution module 1130 is further configured to: in a case that the first relay UE is not identified according to the first identifier, perform any one of the following: identifying the first relay UE according to a fifth identifier in a case that the fifth identifier is received, where the fifth identifier is an identifier obtained after the first relay UE updates the first identifier; refusing the first information; and executing a predetermined error processing manner.

Optionally, the third sending module 1110 is configured to send the second information to the remote UE in a case that it is determined to perform a second operation, where the second operation includes at least one of relay link switching, relay link configuration, relay link reconfiguration, or relay link release.

Optionally, the second execution module 1130 is further configured to correspondingly store the first PC5 Layer-2 identifier and a Uu identifier of the relay UE; and the second execution module is configured to perform at least one of the following: identifying the first relay UE according to the first identifier and the correspondingly stored Uu identifier and first PC5 Layer-2 identifier; or in a case that the first identifier information sent by the relay UE is received and the second identifier information includes at least a second mapping relationship between the PC5 Layer-2 identifier and the Uu identifier of the relay UE, identifying the second relay UE according to the first identifier and the second mapping relationship.

Optionally, the third sending module 1110 is further configured to send first indication information to the relay UE in a case that the first PC5 Layer-2 identifier reported by the relay UE is duplicated with a PC5 Layer-2 identifier reported by another relay UE, where the first indication information is used to indicate that the first PC5 Layer-2 identifier reported by the relay UE is duplicated with the PC5 Layer-2 identifier reported by the another relay UE.

Optionally, the third sending module 1110 is further configured to send second indication information to the relay UE and/or the remote UE, where the second indication information is used to indicate, to the relay UE and/or the remote UE, a relay UE identification manner allowed to be used, and/or a range to which the relay UE identification manner is applicable; and the relay UE identification manner includes at least one of performing UE identification through a PC5 Layer-2 identifier, performing relay UE identification through a Uu identifier, or performing UE identification through a PC5 Layer-2 identifier and a Uu identifier.

In this embodiment, a first identifier is carried in first information and a second identifier is carried in second information, so that determined relay UE can be correctly identified between remote UE and a serving base station, to meet a relay UE identification requirement in processes of establishing/reconfiguring/releasing a relay link and performing measurement reporting. Therefore, a relay operation is smoothly performed, thereby improving efficiency of establishing a link and an architecture, and ensuring service experience and system efficiency of the remote UE.

The apparatus 1100 in this embodiment of this application may be an apparatus, an apparatus or a network side device with an operating system such as a serving base station, or a component, an integrated circuit, or a chip in the network side device.

The apparatus 1100 provided in this embodiment of this application can implement the processes implemented in the method embodiments in FIG. 7 and FIG. 8, and achieve a same technical effect. To avoid repetition, details are not described herein again.

Figure 12:
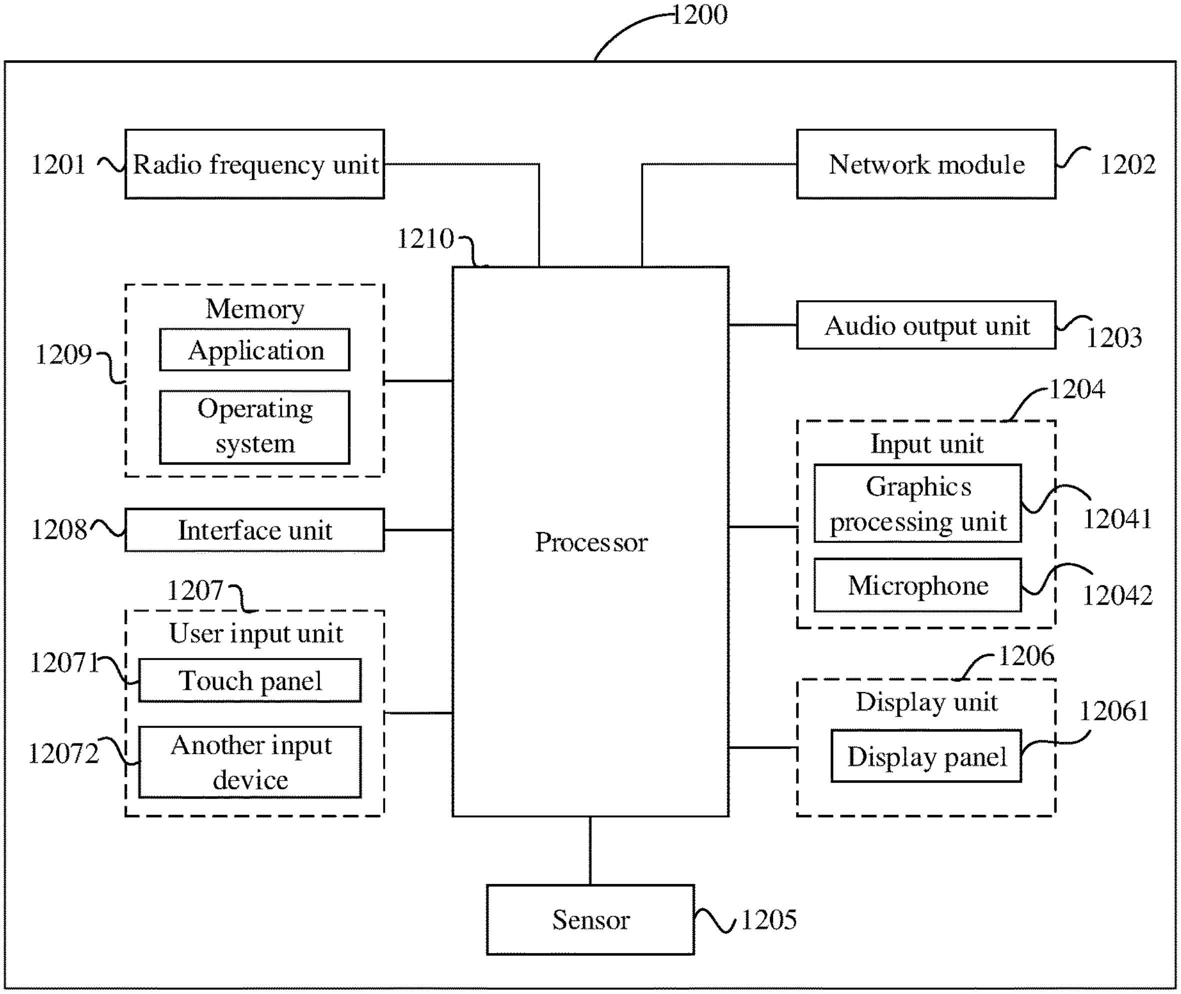
FIG. 12 is a schematic structural diagram of a terminal according to an example embodiment of this application.

An embodiment of this application further provides a terminal, including a processor and a communication interface. The communication interface is coupled to the processor, and the processor is configured to run a program or an instruction to implement the methods in the foregoing method embodiments 200 to 600. This terminal embodiment corresponds to the foregoing method embodiment on the terminal side. Each implementation process and implementation of the foregoing method embodiment may be applicable to this terminal embodiment, and a same technical effect can be achieved. Optionally, FIG. 12 is a schematic diagram of a hardware structure of a terminal according to an embodiment of this application.

A terminal 1200 includes but is not limited to at least a part of components such as a radio frequency unit 1201, a network module 1202, an audio output unit 1203, an input unit 1204, a sensor 1205, a display unit 1206, a user input unit 1207, an interface unit 1208, a memory 1209, and a processor 1210.

A person skilled in the art can understand that the terminal 1200 may further include the power supply (for example, a battery) that supplies power to each component. The power supply may be logically connected to the processor 1210 by using a power supply management system, so as to manage functions such as charging, discharging, and power consumption by using the power supply management system. The terminal structure shown in FIG. 12 constitutes no limitation on the terminal, and the terminal may include more or fewer components than those shown in the figure, or combine some components, or have different component arrangements. Details are not described herein.

It should be understood that, in this embodiment of this application, the input unit 1204 may include a graphics processing unit (GPU) 1041 and a microphone 12042, and the graphics processing unit 12041 processes image data of a still image or a video that is obtained by an image capturing apparatus (for example, a camera) in a video capturing mode or an image capturing mode. The display unit 1206 may include a display panel 12061. The display panel 12061 may be configured in a form such as a liquid crystal display or an organic light-emitting diode. The user input unit 1207 may include a touch panel 12071 and another input device 12072. The touch panel 12071 is also referred to as a touchscreen. The touch panel 12071 may include two parts: a touch detection apparatus and a touch controller. The another input device 12072 may include but is not limited to a physical keyboard, a functional button (such as a volume control button or a power on/off button), a trackball, a mouse, and a joystick. Details are not described herein.

In this embodiment of this application, the radio frequency unit 1201 receives downlink data from a network side device and then sends the downlink data to the processor 1210 for processing; and sends uplink data to the network side device. Usually, the radio frequency unit 1201 includes but is not limited to an antenna, at least one amplifier, a transceiver, a coupler, a low noise amplifier, a duplexer, and the like.

The memory 1209 may be configured to store a software program or an instruction and various data. The memory 1209 may mainly include a program or instruction storage area and a data storage area. The program or instruction storage area may store an operating system, and an application or an instruction required by at least one function (for example, a sound playing function or an image playing function). In addition, the memory 1209 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage device, a flash memory device, or another non-volatile solid-state storage device.

The processor 1210 may include one or more processing units. Optionally, an application processor and a modem processor may be integrated into the processor 1210. The application processor mainly processes an operating system, a user interface, an application, an instruction, or the like. The modem processor mainly processes wireless communication, for example, a baseband processor. It can be understood that, alternatively, the modem processor may not be integrated into the processor 1210.

The radio frequency unit 1201 is configured to perform at least one of the following: sending first identifier information to a serving base station, where the first identifier information includes at least a first PC5 Layer-2 identifier of the relay UE; or sending second identifier information to remote UE, where the second identifier information includes at least a Uu identifier of the relay UE, and the serving base station is a base station serving the relay UE and the remote UE.

Alternatively, the radio frequency unit 1201 is configured to perform at least one of the following: sending first information to a serving base station, where the first information carries at least a first identifier; or receiving second information sent by the serving base station, where the second information carries at least a second identifier, where the first identifier is used to instruct the serving base station to identify first relay UE, the second identifier is used to instruct the remote UE to identify second relay UE, the serving base station is a base station serving the second relay UE and the remote UE, and/or the serving base station is a base station serving the first relay UE and the remote UE.

An embodiment of this application further provides a network side device, including a processor and a communication interface. The communication interface is coupled to the processor, and the processor is configured to run a program or an instruction to implement the steps of the method in the method embodiment 700 or 800. This network side device embodiment corresponds to the foregoing method embodiment on the network side device. Each implementation process and implementation of the foregoing method embodiment may be applicable to this network side device embodiment, and a same technical effect can be achieved.

Figure 13:
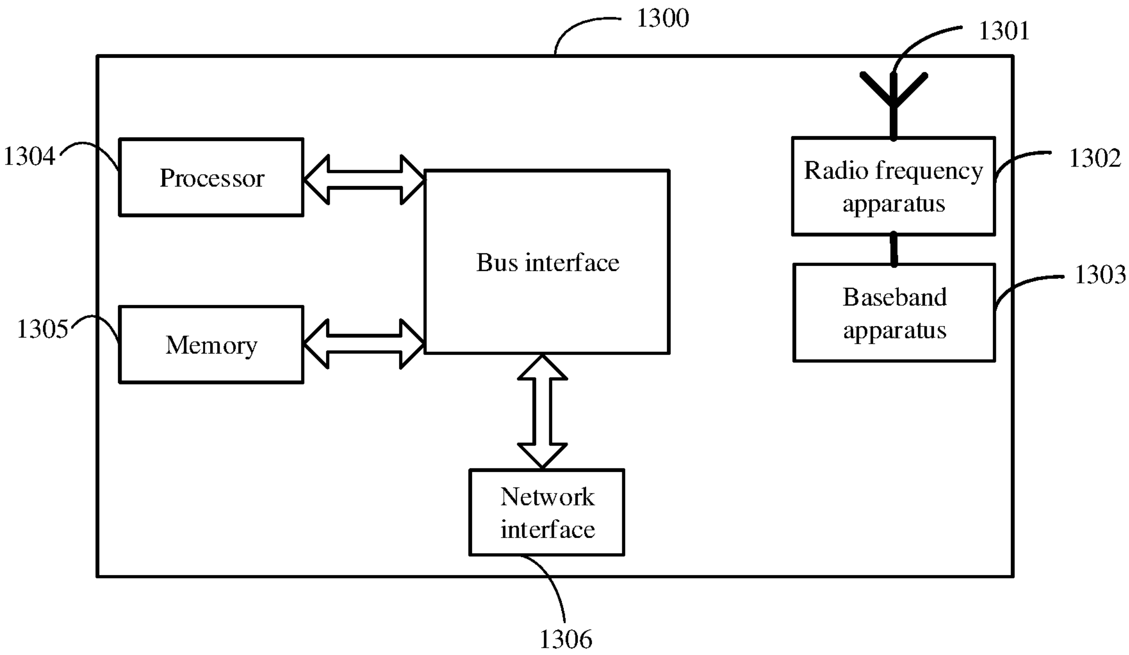
FIG. 13 is a schematic structural diagram of a network side device according to an example embodiment of this application.

Optionally, an embodiment of this application further provides a network side device. As shown in FIG. 13, a network device 1300 includes an antenna 1301, a radio frequency apparatus 1302, and a baseband apparatus 1303. The antenna 1301 is connected to the radio frequency apparatus 1302. In an uplink direction, the radio frequency apparatus 1302 receives information by using the antenna 1301, and sends the received information to the baseband apparatus 1303 for processing. In a downlink direction, the baseband apparatus 1303 processes to-be-sent information, and sends the information to the radio frequency apparatus 1302. The radio frequency apparatus 1302 processes the received information and then sends the information by using the antenna 1301.

The band processing apparatus may be located in the baseband apparatus 1303. The method performed by the network side device in the foregoing embodiment may be implemented in the baseband apparatus 1303. The baseband apparatus 1303 includes a processor 1304 and a memory 1305.

The baseband apparatus 1303 may include, for example, at least one baseband board, where a plurality of chips are disposed on the baseband board. As shown in FIG. 13, one chip, for example, the processor 1304, is connected to the memory 1305, to invoke a program in the memory 1305 to perform the operations of the network device shown in the foregoing method embodiment.

The baseband apparatus 1303 may further include a network interface 1306, configured to exchange information with the radio frequency apparatus 1302. For example, the interface is a common public radio interface (CPRI).

Optionally, the network side device in this embodiment of the present application further includes an instruction or a program stored in the memory 1305 and executable on the processor 1304. The processor 1304 invokes the instruction or the program in the memory 1305 to perform the method performed by the modules shown in FIG. 11, and a same technical effect is achieved. To avoid repetition, details are not described herein again.

An embodiment of this application further provides a non-transitory readable storage medium. The non-transitory readable storage medium stores a program or an instruction, and the program or the instruction is executed by a processor to implement the processes of the foregoing method embodiments 200 to 800, and a same technical effect can be achieved. To avoid repetition, details are not described herein again.

The processor is a processor in the terminal in the foregoing embodiment. The non-transitory readable storage medium includes a non-transitory computer readable storage medium, such as a read-only memory (ROM).

An embodiment of this application further provides a chip. The chip includes a processor and a communication interface, the communication interface is coupled to the processor, and the processor is configured to run a program or an instruction of a network side device to implement the processes of the foregoing method embodiments 200 to 800, and a same technical effect can be achieved. To avoid repetition, details are not described herein again.

It should be understood that the chip mentioned in this embodiment of this application may also be referred to as a system-level chip, a system chip, a chip system, or an on-chip system chip.

An embodiment of this application further provides a computer program product. The computer program product includes a processor, a memory, and a program or an instruction stored in the memory and executable on the processor, and the program or the instruction is executed by the processor to implement the processes of the foregoing method embodiments 200 to 800, and a same technical effect can be achieved. To avoid repetition, details are not described herein again.

An embodiment of this application further provides an electronic device. The electronic device is configured to perform the processes of the foregoing method embodiments 200 to 800, and a same technical effect can be achieved. To avoid repetition, details are not described herein again.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to the prior art may be implemented in a form of a computer software product. The computer software product is stored in a non-transitory storage medium (for example, a ROM/RAM, a floppy disk, or an optical disc), and includes several instructions for instructing a terminal (which may be a mobile phone, a computer, a server, an air conditioner, a network device, or the like) to perform the methods described in the embodiments of this application.

The embodiments of this application are described above with reference to the accompanying drawings, but this application is not limited to the above implementations, and the above implementations are merely illustrative but not restrictive. Under the enlightenment of this application, a person of ordinary skill in the art can make many forms without departing from the purpose of this application and the protection scope of the claims, all of which fall within the protection of this application.

What is claimed is:

1. A relay identification method, comprising:

when a first condition is met, sending, by relay user equipment (UE), first identifier information to a serving base station, wherein the first identifier information comprises at least a first PC5 Layer-2 identifier of the relay UE;

wherein the first condition comprises that the first PC5 Layer-2 identifier of the relay UE changes;

the first PC5 Layer-2 identifier is used by the serving base station to identify the relay UE; and the serving base station is a base station serving the relay UE.

2. The method according to claim 1, wherein the first condition further comprises at least one of the following:

that the relay UE enters a connected state;

or that the first PC5 Layer-2 identifier of the relay UE changes and a change time is within a first time before the relay UE receives a cell switching command, wherein the serving base station is a base station to which a target cell after switching belongs.

3. The method according to claim 1, wherein after the sending, by relay UE, first identifier information to a serving base station, the method further comprises:

sending, by the relay UE, a second PC5 Layer-2 identifier to the serving base station when first indication information sent by the serving base station is received, wherein the first indication information is used to indicate that a first PC5 Layer-2 identifier reported by the relay UE is duplicated with a PC5 Layer-2 identifier reported by another relay UE, and the second PC5 Layer-2 identifier is different from the first PC5 Layer-2 identifier.

4. The method according to claim 1, wherein before the sending, by relay UE, first identifier information to a serving base station, the method further comprises:

receiving, by the relay UE, second indication information sent by the serving base station, wherein the second indication information is used to indicate, to the relay UE, a relay UE identification manner allowed to be used, and/or a range to which the relay UE identification manner is applicable; and the relay UE identification manner comprises at least one of: performing identification through a PC5 Layer-2 identifier, performing identification through a Uu identifier, or performing identification through a PC5 Layer-2 identifier and a Uu identifier.

5. The method according to claim 1, wherein the Uu identifier comprises at least one of: a cell radio network temporary identifier (C-RNTI), a temporary mobile subscription identifier (S-TMSI), an inactive radio network temporary identifier (I-RNTI), or a first indication identifier, and the first indication identifier is an identifier specifically used for identifying the relay UE.

6. The method according to claim 1, wherein the sending, by relay UE, first identifier information to a serving base station comprises:

sending, by the relay UE, the first identifier information to the serving base station based on dedicated signaling or non-dedicated signaling.

7. A relay determining method, wherein the method comprises:

receiving, by a serving base station, first identifier information sent by relay UE when a first condition is met, wherein the first identifier information comprises at least a first PC5 Layer-2 identifier of the relay UE;

wherein the first condition comprises that the first PC5 Layer-2 identifier of the relay UE changes;

the first PC5 Layer-2 identifier is used by the serving base station to identify the relay UE; and the serving base station is a base station serving the relay UE.

8. The method according to claim 7, wherein the method further comprises:

correspondingly storing the first PC5 Layer-2 identifier and a Uu identifier of the relay UE.

9. The method according to claim 7, wherein after the receiving, by a serving base station, first identifier information sent by relay UE, the method further comprises:

sending first indication information to the relay UE when a first PC5 Layer-2 identifier reported by the relay UE is duplicated with a PC5 Layer-2 identifier reported by another relay UE, wherein the first indication information is used to indicate that the first PC5 Layer-2 identifier reported by the relay UE is duplicated with the PC5 Layer-2 identifier reported by the another relay UE.

10. The method according to claim 7, wherein the method further comprises:

sending second indication information to the relay UE and/or the remote UE, wherein the second indication information is used to indicate, to the relay UE and/or the remote UE, a relay UE identification manner allowed to be used, and/or a range to which the relay UE identification manner is applicable; and the relay UE identification manner comprises at least one of: performing UE identification through a PC5 Layer-2 identifier, performing relay UE identification through a Uu identifier, or performing UE identification through a PC5 Layer-2 identifier and a Uu identifier.

* * * * *